(12) United States Patent
Rodger et al.

(10) Patent No.: US 10,222,233 B2
(45) Date of Patent: Mar. 5, 2019

(54) ACTUATOR POSITION SENSING

(71) Applicant: Ultra Motion LLC, Cutchogue, NY (US)

(72) Inventors: Sean Rodger, Southold, NY (US); Erwin Rodger, Southold, NY (US); Rob Koch, Southold, NY (US); Tom Quartararo, Brookhaven, NY (US)

(73) Assignee: ULTRA MOTION LLC, Cutchogue, NY (US)

( * ) Notice: Subject to any disclaimer, the term of this patent is extended or adjusted under 35 U.S.C. 154(b) by 24 days.

(21) Appl. No.: 15/620,228

(22) Filed: Jun. 12, 2017

(65) Prior Publication Data

US 2017/0284828 A1    Oct. 5, 2017

Related U.S. Application Data

(63) Continuation-in-part of application No. 14/521,029, filed on Oct. 22, 2014, now Pat. No. 9,680,348.

(60) Provisional application No. 61/894,155, filed on Oct. 22, 2013.

(51) Int. Cl.
  *G01D 5/14* (2006.01)
  *G01D 18/00* (2006.01)
  *H02K 11/21* (2016.01)
  *H02K 7/116* (2006.01)

(52) U.S. Cl.
  CPC ............ *G01D 5/14* (2013.01); *H02K 7/116* (2013.01); *H02K 11/21* (2016.01); *G01D 5/145* (2013.01); *G01D 18/00* (2013.01)

(58) Field of Classification Search
  CPC ........................................................ G01D 5/14
  USPC ................................................... 318/721, 34
  See application file for complete search history.

(56) References Cited

U.S. PATENT DOCUMENTS

| | | | | |
|---|---|---|---|---|
| 5,901,801 A * | 5/1999 | Toida | ................. | H02K 7/116 180/65.1 |
| 5,912,541 A | 6/1999 | Bigler et al. | | |
| 5,937,835 A * | 8/1999 | Turner | ................. | F02M 26/68 123/568.24 |
| 7,332,881 B2 * | 2/2008 | Clark | ................. | B60L 3/108 318/139 |

* cited by examiner

*Primary Examiner* — David Luo
(74) *Attorney, Agent, or Firm* — Tutunjian & Bitetto, P.C.

(57) ABSTRACT

Methods and systems for measuring multi-turn angular position include a system of N gears meshed with one another, each gear having a unique number of teeth. A first gear is mounted to an input shaft. A set of N angular position sensors are each configured to measure the angular position of a respective gear in the system of N gears within one rotation. A control module is configured to determine an angular position of the input shaft over multiple rotations using the measured angular positions of the N gears.

31 Claims, 5 Drawing Sheets

ACTUATOR POSITION SENSING

CROSS REFERENCE TO RELATED APPLICATIONS

This application is a Continuation-in-Part of co-pending application Ser. No. 14/521,029, filed on Oct. 22, 2014 and claims the benefit of provisional Application No. 61/894,155, filed on Oct. 22, 2013, which are incorporated herein by reference in its entirety.

BACKGROUND

Field of the Invention

Electromechanical actuators and, in particular, position sensing and motor commutation in electromechanical actuators.

Description of Related Art

Brushless direct current (BLDC) motors are a form of electric motor, where a current is passed through, e.g., a series of solenoids to provide a motivating force. Coordinating the motion of the motor with the application of current to the solenoids is called commutation, a function which has traditionally been performed with the use of Hall Effect sensors to determine when current should be applied to a given solenoid.

Fine, incremental, position sensing has been performed using optical encoding, but needs to reestablish an origin on every loss of power. Position sensing can also be performed using absolute analog sensors like potentiometers. However, potentiometers usually have a sliding or rolling contact, which makes them susceptible to wear over long-term use. Furthermore, analog devices are inherently noisy, leading to positional inaccuracies, and their output must be also be digitized to be useful, which limits resolution. Some digital, absolute position sensors have been proposed that make use of separate power supplies to maintain their absolute position after an origin is established. Others make use of computationally inefficient lookup tables that map the unique states of a sensor to a unique position over multiple turns. These solutions are both complex and costly to manufacture.

The inclusion of analog position sensors renders the motor susceptible to electrical noise and wear, generally reducing the accuracy, and decreasing the potential life of the device. Furthermore, conventional solutions that are based on incremental position encoders need to perform a homing operation upon power-up, causing both delay and motion that may be detrimental to real-time control applications.

SUMMARY

A position sensor includes a system of N gears meshed with one another, each gear having a unique number of teeth. A first gear is mounted to an input shaft. A set of N angular position sensors are each configured to measure the angular position of a respective gear in the system of N gears within one rotation. A control module is configured to determine an angular position of the input shaft over multiple rotations using the measured angular positions of the N gears.

An electromechanical actuator includes an electric motor that has a rotor and a stator. A mechanical output stage is driven by said electric motor. A system of N gears is meshed with one another. Each gear having a unique number of teeth. A first gear is mounted to an input shaft that rotates in accordance with the electric motor. A set of N angular position sensors are each configured to measure the angular position of a respective gear in the system of N gears within one rotation. A control module is configured to determine an angular position of the input shaft over multiple rotations using the measured angular positions of the N gears.

A method of determining angular position over multiple rotations includes measuring an angular position within one rotation of each gear within a system of N gears that are meshed together. Each gear has a unique number of teeth. A number of full cycles for subsets of the system of N gears is iteratively determined. A number of full rotations of a first gear is calculated using the iteratively determined number of full cycles for the subsets of gears. An angular position of the first gear over multiple rotations is calculated using the calculated number of first gear full rotations and the measured angle value of the first gear within one rotation.

These and other features and advantages will become apparent from the following detailed description of illustrative embodiments thereof, which is to be read in connection with the accompanying drawings.

DESCRIPTION OF THE DRAWINGS

The disclosure will provide details in the following description of preferred embodiments with reference to the following figures wherein.

DETAILED DESCRIPTION

Embodiments of the present principles provide a reliable, low cost, high-performance electromechanical actuator that has integrated motor control and high-resolution absolute position awareness. Stated generally, an electric motor turns a drive shaft to move a mechanical output stage that is limited to a fixed range of motion. The drive shaft is fitted with a primary gear that is meshed with a secondary gear having a different number of teeth. Angular position sensors are configured to detect the angular position of the primary and secondary gears and produce a digital value representing said angular positions within one rotation. A processor reads the output of the angular position sensors and calculates the angular position of the primary gear over multiple rotations using the angle values and pre-stored reference values for each angle sensor. This computed angular position is then used to determine the absolute position of said electromechanical actuator.

Figure 1:
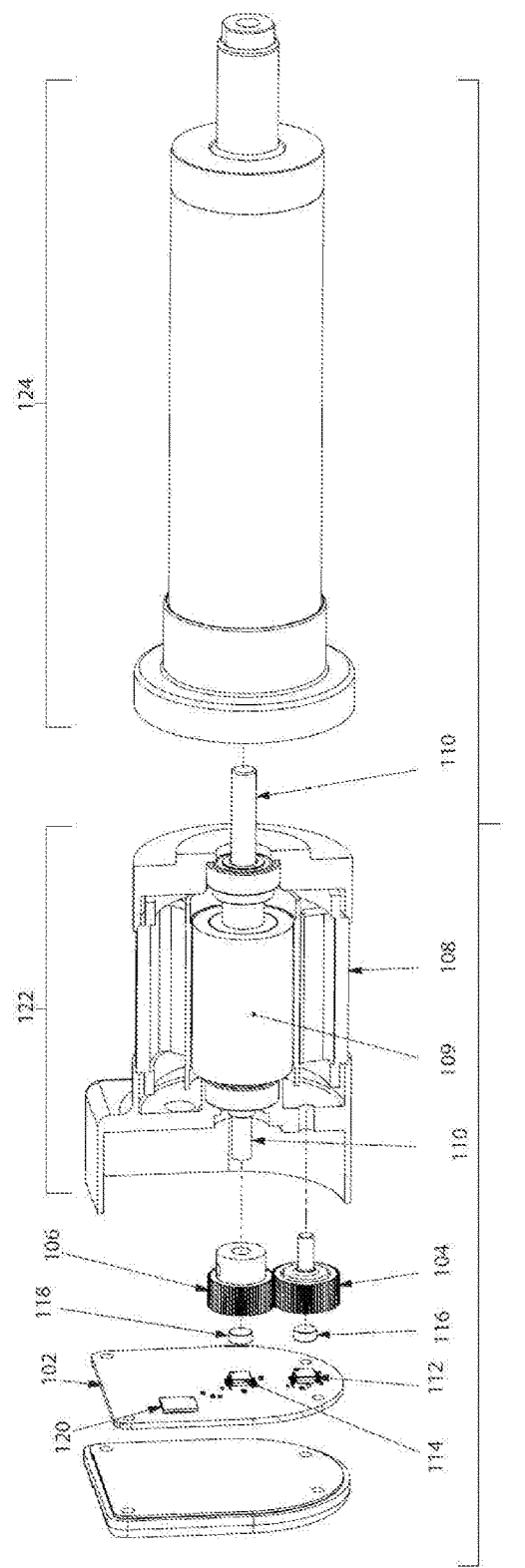
FIG. 1 is an exploded-view diagram of an exemplary electromechanical actuator capable of absolute position sensing according to the present principles.

Referring now to FIG. 1, a diagram of an electromechanical actuator 100 is shown. A control circuit 102 is mounted over gears 104 and 106 that engage one another. The two gears 104 and 106 have differing numbers of teeth. In one exemplary embodiment, gear 104 has 63 teeth and gear 104 has 64 teeth, though many combinations of tooth numbers may be adapted according to the present principles. The gear 106 is attached to a shaft 110 that is attached to rotor 109 and driven by stator 108. The shaft 110, rotor 109, and stator 108 form a brushless DC (BLDC) motor, which is used to generate the motion of the electro-mechanical actuator 100. It is particularly contemplated that the stator 108 and rotor 109 are not in contact, thereby preventing unnecessary wear.

Control circuit 102 has two magnetic sensors 112 and 114 that correspond with respective diametrically polarized magnets 116 and 118 in the gears 104 and 106. One example of an appropriate magnet is a simple bar magnet. It is specifically contemplated that the sensors 112 and 114 do not contact the magnets 116 and 118, to avoid unnecessary wear, but it should be recognized that the present principles would be just as applicable if the sensors 112 and 114 and magnets 116 and 118 did touch. As the gear 106, which is connected to the shaft 110, rotates with the action of the electromechanical actuator 100, the gear 106 causes the gear 104 to rotate as well. Due to the difference in tooth number between the gears, a phase difference between the gears 104 and 106 changes as the gears rotate. The sensors 112 and 114 measure the angular position of the magnets 116 and 118 within one rotation, providing angular position information to control module 120.

The control module 120 includes a memory that stores a reference value for each angle sensor during a calibration procedure. These reference values together represent a theoretical position of the actuator at or beyond one of its mechanical stops. It should be noted that the present principles also apply if the theoretical position is within the actuator mechanical stops. The control module 120 calculates a number of full rotations of gear 106 between the current angular position of gear 106, and a position described by the stored reference values for each magnetic angle sensor. The control module 120 then uses the calculated number of full rotations of gear 106, the output value from sensor 114, and the stored reference value for sensor 114 to compute the position of actuator 100 in relation to the theoretical position that is described by the stored reference values.

The maximum number of primary gear full rotations that may be encoded according to the present principles is equal to the least common multiple of the number of teeth on the primary gear and the number of teeth on the secondary gear, divided by the number of teeth on the primary gear. In one exemplary embodiment, the primary gear 106 has 63 teeth and the secondary gear 104 has 64 teeth. The maximum number of primary gear full rotations that may be encoded by this embodiment therefore is 64.

The physically limited travel range of the mechanical output 124 corresponds with a fixed number of rotations of the drive shaft 110 and primary gear 106. This number of rotations is equal to or less than the maximum number of primary gear full rotations that may be encoded given the number of teeth on the primary gear 106 and the secondary gear 104 and according to the principles described in the previous paragraph.

A calibration procedure is used to obtain and store the reference values for each angle sensor. The calibration procedure may help ensure that actuator position, as calculated using the two gear angles and the two stored reference values, will not pass zero or the maximum possible value inside of the physical travel range of the actuator. By establishing that the maximum number of full rotations that may be encoded with the numbers of teeth on the primary and secondary gears is not exceeded, and that the theoretical position described by the stored reference values is outside of the physical range of travel of the actuator, the determination of actuator position according to the present principles will reliably produce an output that does not overflow or underflow across the full travel of the actuator. By controlling the theoretical position referred to by the stored angular reference values, the calibration routine may also be used to offset the range of possible output positions by a desired value.

The control module 120 may also use position information from one of the gears 104 and 106 and a separate motor shaft offset value 207 stored in non-volatile memory to calculate a rotor angle of rotor 109. This rotor angle may be used to commutate the stator 108, engaging and releasing solenoids according to the position of the shaft 110. Control module 120 may also use the calculated rotor angle for Field Oriented Control of the motor.

The mechanical output stage 124 may include a ballscrew that converts angular motion generated by stator 108 and rotor 109 into linear motion for the electromechanical actuator 100. According to the above-described embodiment, the ballscrew allows for 64 or fewer revolutions of the gear 106 to complete a full linear stroke of the actuator 100. For example, a ⅛" pitch ballscrew would operate within 8 inches of travel. It should be recognized that these numbers may be adjusted according to the particular gears 104 and 106 used such that the number of rotations encoded is greater than or equal to the number of rotations required to move from one end of the actuator's mechanically limited travel range to the other.

The above-described design for an electromechanical actuator 100 replaces a number of sensors that would otherwise be needed, using instead a single control board 102 that has integrated absolute digital position sensing components. This integration provides a superior operating temperature range and a long operating life, is resistant to vibration and shock, is resistant to electrical noise, has fewer failure points, and is especially well suited for controlling electromechanical actuators. Because the absolute actuator position sensor can calculate the true position of the actuator, the linear actuator 100 can know its exact position within milliseconds after power is supplied to the control module. This integrated design further allows the stator 108 to be in the same enclosure as the sensor and control board 102. In the present embodiment, control board 102 is the only electronic component needed in the actuator. Where existing technology might involve sensitive position feedback systems or mechanical limit sensing systems to be housed inside of the relatively harsh environment of the ballscrew compartment, the present embodiment needs no sensing systems to be housed within the ballscrew compartment, and it does not require the additional connectors, wires, and sensors that those systems entail. The present embodiments make it possible to place all of the sensing and control electronics for the electromechanical actuator on the single protected circuit board 102.

Figure 2:
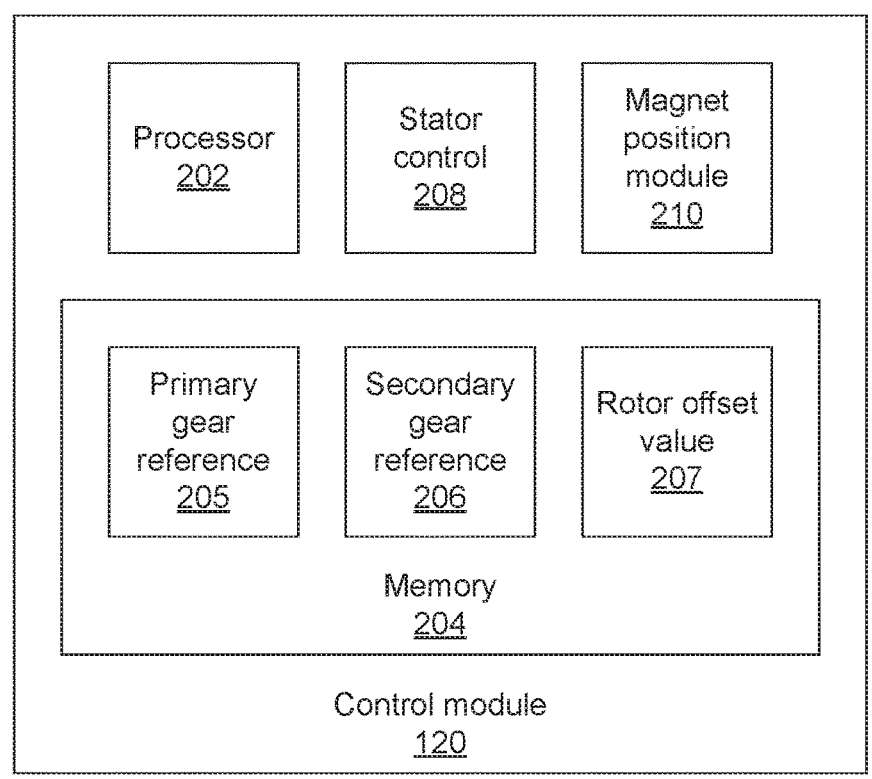
FIG. 2 is a diagram of a control module capable of absolute position sensing according to the present principles.

Referring now to FIG. 2, a diagram of control module 120 is shown. The control module 120 accepts information from the sensors 112 and 114 at a magnet position module 210. The magnet position module 210 uses processor 202 to determine a present position of the two magnets 116 and 118 and converts that information to an angular position of primary gear 106 over multiple rotations. Processor 202 consults reference values 205 and 206, stored in non-volatile memory 204. These reference values, 205 and 206 correspond to a theoretical actuator position that will serve as a reference when determining the actuator position. The calibration values 205 and 206 may be stored in a write-once memory, because the calibration need only be performed once. Stator control module 208 can also use the single turn angle value of either the primary or secondary angle sensor that is provided by the magnet position module, combined with an angular offset value 207 stored in non-volatile memory 204, to compute a rotor angle value that may be used to control the stator 108.

The control module 120 is configured to compute the angular position over multiple rotations of said primary gear 106 and said shaft 110 using angle values read from both of the two angle sensors 112 and 114 along with reference values 205 and 206 that are pre-stored in said non-volatile memory 204 during a calibration procedure. The control module 120 may be further configured to drive the motor. In this case, the control module 120 may be configured to compute a rotor angle for the motor using the angle sensor value associated with the rotor combined with an offset value 207 that is pre-stored in said non-volatile memory 204 during the calibration procedure. The control module may use said rotor angle as angular feedback for Field Oriented Control of the motor. The control module 120 may further control the position or velocity of the mechanical output stage within its physical range of travel using a closed-loop algorithm that drives the motor and that uses the computed angular position over multiple rotations of the primary gear as feedback. In the case where the rotor is coupled to the secondary gear, the gears may be used to transmit torque from the motor to the input shaft of the mechanical output stage.

Embodiments described herein may be entirely hardware or may include both hardware and software elements. In a preferred embodiment, the present invention is implemented as hardware with control software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or storage devices through intervening private or public networks. Modems, cable modem and Ethernet cards are just a few of the currently available types of network adapters.

Figure 3:
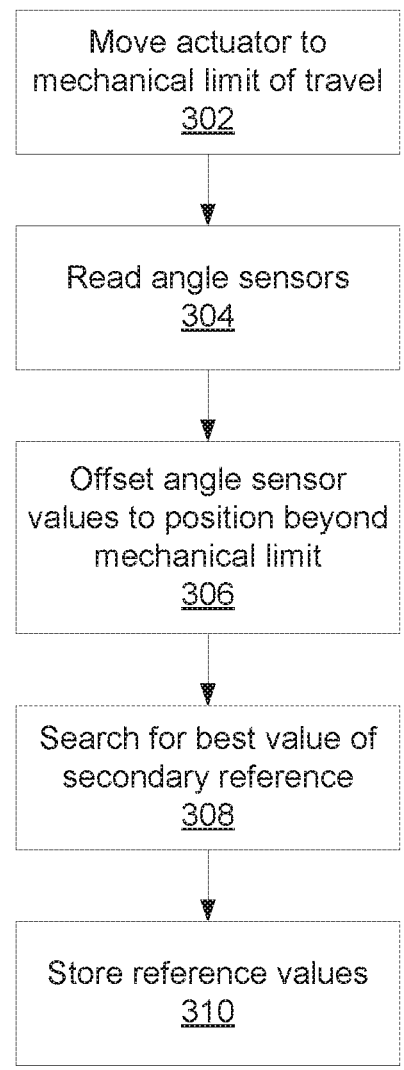
FIG. 3 is a block/flow diagram of a method for one-time calibration of an actuator capable of absolute position sensing according to the present principles.

Referring now to FIG. 3, a method for creating calibration values 205 and 206 is shown. Calibration values 205 and 206 may be set upon assembly, before the actuator 100 leaves the factory or they may be set upon command by the user. Calibration need only be set once because the relationship between the angular position of gears 106 and 104, and the position of the mechanical output stage 124 is fixed, and will not change. The two-gear design of the present embodiments is tolerant to vibration, shock and temperature changes.

At block 302, the linear actuator 100 is moved to one of its mechanical limits of travel. Block 304 reads the angular positions of the primary and secondary gears using sensors 112 and 114. In block 306, the angle values read from each sensor are modified by combining the value of sensor 114 with an offset value and combining the value of sensor 112 with the product of said offset value and the ratio of the number of teeth on the primary gear to the number of teeth on the secondary gear. The value resulting from the combination of the primary gear angle sensor value and an offset value is stored as the primary gear reference value 205. The value obtained by combining the secondary gear angle sensor value with the scaled offset value is the estimated secondary reference value. Block 308 searches for an optimal value for the estimated secondary reference value by moving the actuator and computing the actuator position using several different values for the secondary gear reference value 206. The estimated secondary reference value is tested in this way along with several numbers that are close to the estimated secondary reference value. The number that, when used as the secondary gear reference value 206, produces the lowest overall error signal as computed by the present method is stored as the secondary reference value 206 in block 310. It should be recognized that the above calibration can take place at any time and that any position inside or outside of the actuator range of travel can be used as the reference position that is stored as reference values 205 and 206.

This one-time calibration obviates the need to extend or retract a linear actuator when powering on. Because conventional devices often lack absolute position determination, they find the limits of motion over again after each power cycle. In contrast, the present embodiments can instantly determine how far a current position is from either extreme—the values for the extremes stay stable. A further result of the calibration is that the gears 104 and 106 need not be assembled in any particular orientation with respect to one another—the above calibration will account for any difference in initial position.

Conventional devices use limit switches to prevent over-travel, the present principles provide a mechanism for absolute position sensing. As such, a simple comparison between the present position and the limits of the device provides a simple way to prevent over-travel without additional circuit components.

Figure 4:
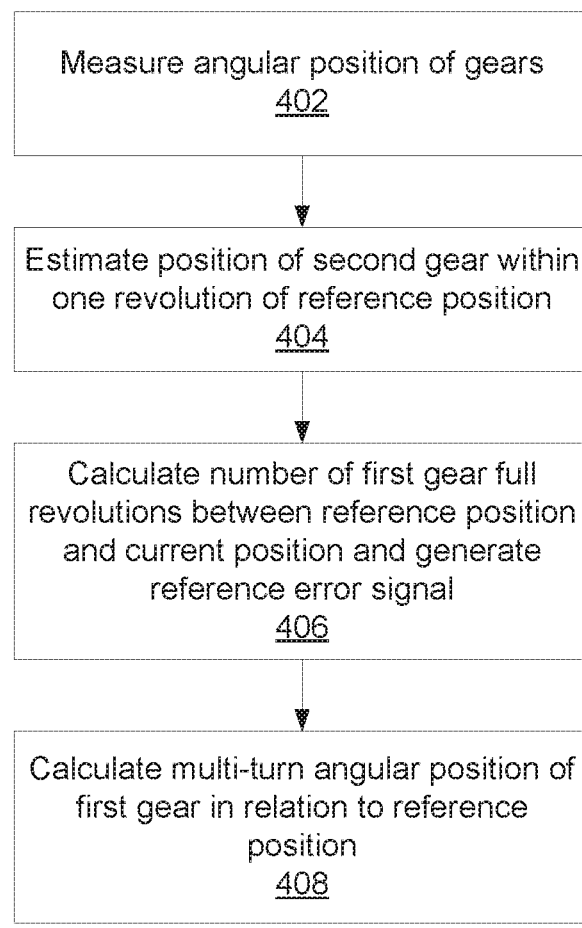
FIG. 4 is a block/flow diagram of a method for determining a multi-turn angular position of a shaft according to the present principles.

Referring now to FIG. 4, a method for determining the position of an electromechanical actuator 100 is shown. Block 402 measures the positions of gears 106 and 104 as above. The gears are designated as a first gear 106 and a second gear 104. Block 404 estimates a theoretical position for the second gear as though the first gear is within one rotation of the actuator position described by reference values 205 and 206. To estimate this theoretical position, the difference between the value of the primary sensor 114 and the stored primary sensor reference value 205 is multiplied by the ratio of $$\frac{PT_{num}}{ST_{num}}.$$

The resulting value is then combined with the stored reference value of the secondary sensor 206. This combined value, when viewed as an angular value within one rotation, is stored as the estimated theoretical position for the second gear.

The estimated theoretical position of the second gear may be calculated as follows:

$$rni\left((A_p - R_p)\left(\frac{PT_{num}}{ST_{num}}\right) + R_s\right) \bmod RES_s$$

Where $PT_{num}$ is the number of teeth on the primary gear 106, $ST_{num}$ is the number of teeth on the secondary gear 104, $A_p$ is the primary angle sensor value, $A_s$ is the secondary angle sensor value, $R_p$ is the primary sensor reference value 205, and $R_s$ is the secondary sensor reference value 206, $RES_s$ is the resolution of the secondary angle sensor 112. Resolution in the present embodiments denotes the number of different angular positions the angle sensors can distinguish. In one exemplary embodiment, an angle sensor may have a resolution of 1024, differentiating between 1024 different angular positions in one full rotation.

Block 406 calculates a number of full rotations of the first gear using the estimated theoretical position of the second gear and the measured second gear position. If the number of teeth for the respective gears differs by one, this may be accomplished by finding the difference between the estimated second position and the actual second position and then dividing the result by a window size. The remainder is used to round the result. The remainder is used to round the result and calculate a reference error signal. If the number of teeth differs by greater than one, a window position is systematically changed until the measured second position is within the window and the measured second position's distance from the center of the window is used as the reference error signal.

Block 408 calculates a multi-turn angular position of the first gear with a calculated number of first gear full rotations as well as the first gear's position as a difference between the measured position and a stored reference position for the first gear. From this information, the absolute multi-turn angular position of the first gear may be determined.

The travel range of the mechanical output, the numbers of teeth on the gears 104 and 106, and the resolution and maximum error of the angle sensors 112 and 114 are configured such that:

$$ENC_{max} = LCM(PT_{num}, ST_{num}) / PT_{num}$$

$$ENC_{max} \geq ROT_{max}$$

$$\frac{RES_s}{ENC_{max}} > 2\left(\frac{(ERR_p RES_s PT_{num})}{RES_p ST_{num}} + ERR_s\right)$$

where $ROT_{max}$ is the maximum number of rotations possible for the input shaft of the mechanically-limited output stage, $PT_{num}$ is the number of teeth for the primary gear 106, $ST_{num}$ is the number of teeth for the secondary gear 104, $RES_p$ is the measurement resolution of the primary sensor 114 as the total number of individual angles it may discern, $RES_s$ is the measurement resolution of the secondary sensor 112 as the total number of individual angles it may discern, $ERR_p$ is the maximum total error of the primary angle sensor in units of output increments, and $ERR_s$ is the maximum total error of the secondary sensor in units of output increments.

The estimated theoretical position for the second gear if the first gear is within one rotation of the theoretical actuator position described by reference values 205 and 206 can be calculated as follows: The difference between the primary sensor 114 and the stored reference value is multiplied by the ratio of $PT_{num}/ST_{num}$ and the result is rounded to the nearest integer. This integer is then added to the stored reference value of the secondary sensor 112. The modulus of the resulting value and $RES_s$ is stored.

$$\left((A_p - R_p)\left(\frac{PT_{num}}{ST_{num}}\right) + R_s\right) \bmod RES_s \quad (1)$$

where $A_p$ is the primary angle sensor value, $A_s$ is the secondary angle sensor value, $R_p$ is the primary sensor reference value, $R_s$ is the secondary sensor reference value, and $RES_s$ is the resolution of the secondary angle sensor.

If $PT_{num}$ and $ST_{num}$ differ by one, then the difference between the estimated second angle and the actual value of the secondary angle sensor 112 is stored as the difference between $A_s$ and the above modulus.

$$A_s - (1) \quad (2)$$

The integer WIN is defined as $RES_s/ENC_{max}$, and the following is stored:

$$(2)/WIN \quad (3)$$

The remainder of this division is stored as REM and the result is stored as ROT. ROT is then incremented if REM>WIN/2. For the sake of simplicity, it may be assumed that the resolutions of the two sensors 112 and 114 are equal. This is not strictly necessary, but it eliminates the need to scale values between the two.

Block 404 estimates the position of the second gear 104 if the shaft 110 is within one full positive resolution of the reference position. This reference position is stored as angle sensor reference values $R_p$ and $R_s$. This estimated position is shown above as equation (1). Implementation of this step may be made more efficient by configuring the gears such that $ST_{num}$ is a power of two. On a typical processor, dividing by a power of two can be replaced by a bit shift operation, which is computationally efficient. The estimated position of the secondary angle sensor is thus equal to:

$$(\Delta_s + R_s) \bmod RES_s$$

where $\Delta_s$ is the estimated change in the secondary angle from the reference $R_s$.

Calculating the number of first gear full rotations using estimated position and measured position in block 406 results in a stored value for the number of full revolutions of the first gear 106 in the absolute multiturn angular position of the primary gear 106 as well as a reference error value that may be used to check for erroneous operation of the encoder and optimize the stored angle sensor reference values during calibration.

As noted above, calculations are simpler when the number of teeth between the two gears differs by one. In this case, the difference between the estimated secondary angle sensor value and the measured value of the secondary angle sensor 112 is divided by a constant integer representing the window size WIN. Both the remainder REM and the result ROT of the division are stored. ROT is incremented if the integer remainder is greater than or equal to half the window size (i.e., rounded up one full rotation).

The reference error value $ERR_{ref}$ is calculated by taking the difference between WIN/2 and REM. The resulting reference error value represents deviation from the expected phase relationship between the primary and secondary angle sensors. This value may be used to detect a problem with the physical encoder implementation or with the stored reference values. The error reference signal $ERR_{ref}$ may also be used to search for optimal reference values during the above described calibration routine.

If the numbers of teeth differ by more than one, the angular position of the secondary gear is iteratively tested to determine if it falls within a window. The position of said window is systematically changed between iterations. If the measured secondary angle sensor value is within said window then the value of an index, having been changed to a new value for each iteration, is stored as the number of full rotations of the shaft 110 (ROT). If the value is not within this range, the index value is changed and the position of said window is changed by a value equal to the resolution of the secondary sensor multiplied by the number of teeth on the primary gear and divided by the number of teeth on the secondary gear. The measured value is again tested for inclusion in said window and the above process is repeated until ROT is stored. When ROT is stored, the value of the reference error signal $ERR_{ref}$ is calculated from the difference between the center of said window and the measured value of the secondary angle sensor.

The outputs include the multiturn angular position of the shaft 110, the angular position of an optionally connected rotor within one rotation, and the reference error signal. The multiturn angular position of the shaft 110 ($POS_{out}$) is computed by multiplying the number of rotations of the shaft 110 by the resolution of the primary angle sensor and adding the difference between the actual value of the primary angle sensor and the reference value for the primary angle sensor:

$$POS_{out}=(ROT*RES_p)+(A_p-R_p)$$

The angle of the optionally connected rotor is computed by changing the actual value of the angle sensor associated with the rotor by a pre-stored offset value that is stored in memory during a calibration procedure.

In an optional step, the output is checked to determine whether it has changed more than a pre-set amount since it was last calculated. If so, an error flag may be generated and action may be taken to correct $POS_{out}$ before the value is used.

Since these reference values are used to compute the absolute position of the electromechanical actuator, it is important that the stored reference values 205 and 206 represent the true phase relationship between the primary and secondary gears Eliminating error from these stored values is possible by using the computed reference error signal $ERR_{ref}$ to detect the optimal relationship between $R_p$ (205) and $R_s$ (206).

First, the actuator is moved to one of its physical limits, either under its own power or manually. With the actuator up against the physical stop, both angle sensors 112 and 114 are sampled. The value of the primary angle sensor, $A_p$, is offset to a value that corresponds to a theoretical position beyond said physical stop. The resulting angle value is $R_p$ and is stored in memory 204. The offset is denoted herein as $P_{offset}$. The value of the secondary sensor is offset in the opposite direction by a value equal to $P_{offset}$PT/ST. The resulting angle is used as an estimated value for the secondary sensor.

A number of test values are then defined around this estimated value. The position sensor's reference error output $ERR_{ref}$ is computed using each test value as the secondary sensor reference value 206, and indicators of the value of the error signal $ERR_{ref}$ are compiled and stored as the actuator is physically moved. These indicators may include sum, mean value, and peak value. After each test value is tried, the stored indicators for each value are compared and a value showing the lowest indicated values for $ERR_{ref}$ is selected and stored as the reference value for the secondary sensor 206. The motion through the test values may be done in a single physical motion with multiple parallel instances of position detection according to the present principles, each with a different test value for the secondary sensor reference value 206. This way, all of said indicators may be generated at once.

Calibration also finds the rotor offset for the motor. The actuator is first moved to a position that is no less than one full rotation of the rotor away from either of the actuator's physical stops. The rotor is then moved under power to a known angular offset, e.g. aligned to one of the motor phases. The angle sensor associated with the rotor is then read. The resulting angle value may then be modified by adding or subtracting a fixed offset. The resulting angle value is stored as the rotor offset value. This is used by the control module 120 to determine the rotor's angle using the associated angle sensor value. The rotor angle can be used for Field-Oriented Control or high-resolution commutation of the motor.

Although the embodiments heretofore described have focused on position sensing using only two gears 104 and 106, it should be understood that the present principles may be extended to incorporate any number of gears. Each additional gear, each with a respective magnet, adds another order of magnitude to the potential range of the position sensor. The gears are arranged with the primary gear coupled to an input shaft, and all additional gears meshed either directly or indirectly with the primary gear. Considering, for example, a third gear that meshes with the teeth of the primary gear 106, having a number of teeth that is one different from a number of teeth of the secondary gear 104, and different than the number of teeth on the primary gear 106, the angular phase of the third gear encodes a number of full cycles of the primary gear 106 and the secondary gear 104. As used herein, the term "mesh" refers to the engagement of the teeth of one gear with the teeth of another gear.

In one specific three-gear example, one full cycle of the primary and secondary gears is exactly 64 revolutions of the primary gear and 63 revolutions of the secondary gear. The third gear, having a different number of teeth from both the primary and secondary gear, can be used to calculate a number of full cycles of the primary and secondary gears in relation to the multi-turn angular position represented by the stored reference angle values.

The same principle can be extended to any number of gears N, with each subsequent gear G encoding a number of complete cycles of all of the previous gears, $LCM(T_1, \ldots, T_G)/LCM(T_1, \ldots T_{G-1})$. Thus, for an N-gear embodiment (where N>2), the number of rotations encoded by a particular gear combination is the least common multiple of every gear's number of teeth divided by the number of teeth on the primary gear ($T_1$):

$$\frac{LCM(T_1, T_2, \ldots, T_N)}{T_1}$$

As in the two-gear embodiment, each and every gear has an associated angle sensor and each gear and angle sensor has an associated reference value. The reference value represents the angle sensor value at some known multi-turn angular position of the primary gear (e.g., at zero).

Figure 5:
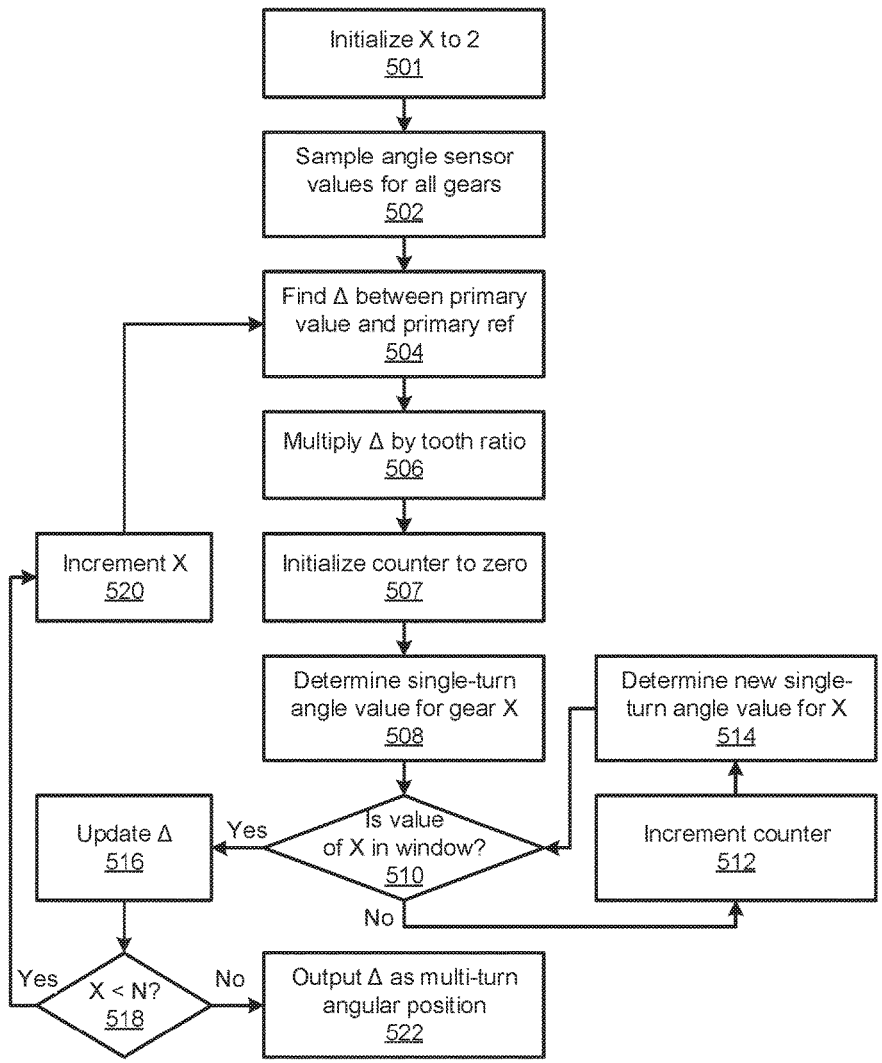
FIG. 5 is a block/flow diagram of a method for determining a multi-turn angular position of a shaft using N gears according to the present principles.

Referring now to FIG. 5, a method of position sensing using N gears is shown. Block 501 initializes a gear index value X equal to 2. The gears are indexed from 1 to N, with the primary gear having index number 1. Block 502 samples the single-turn angle sensor values for each of the N gears, providing N respective single-turn angle values. Block 504 determines a value $\Delta$ equal to a difference between the sampled angle value of the primary gear and the stored reference value for the primary gear. Block 506 stores a value $\Delta_X$ that is equal to $\Delta$ multiplied by the number of teeth on the primary gear divided by the number of teeth on gear X:

$$\Delta_X = \Delta\left(\frac{T_1}{T_X}\right).$$

Block 507 initializes a counter value CYCLE_COUNT to zero. Block 508 combines (e.g., adds or subtracts) $\Delta_x$ with the stored reference value for gear X and converts the result of that combination to a single-turn angle value WIN_CENTER by performing a modulus with the resolution of the angle sensor for gear X. Block 510 determines whether the sampled angle value of gear X falls within a window of contiguous gear angle values with a center angle equal to WIN_CENTER and with a window size equal to one full 360 degree rotation, divided by the least common multiple of the number of teeth on each gear from 1 to X, divided by the least common multiple of the number of teeth on each gear from 1 to X−1.

$$WINDOW = \begin{cases} \dfrac{360}{\frac{(LCM(T_1, \ldots, T_X))}{LCM(T_1, \ldots, T_{X-1})}}, & X > 2 \\ \dfrac{360}{\frac{LCM(T_1, \ldots, T_X)}{T_1}}, & X = 2 \end{cases}$$

If block 510 determines that the sampled angle value does not fall within the window, block 512 increments the counter CYCLE_COUNT. Block 514 combines the window center value WIN_CENTER with a value equal to the change caused in the angle of gear X by one complete combined cycle of the subset of all gears with an index value lower than X. In other words, the advance of the lower-indexed gears by one cycle will causes a certain angular movement in gear X, and this value is used in block 514 to produce an updated single-turn angle value for X by using a modulus by the resolution of the angle sensor for gear X. Processing then returns to block 510.

If block 510 determines that the sampled angle value does fall within the window, block 516 updates $\Delta$. In particular, block 516 adds a value to $\Delta$ that is equal to CYCLE_COUNT, multiplied by the least common multiple of the numbers of teeth on all gears having an index value less than X and by the resolution of the angular position sensor of the primary gear ($RES_p$), divided by the number of teeth on the primary gear (for values of X>2). For X=2, a slightly different form is followed:

$$\Delta = \begin{cases} \Delta + \dfrac{CYCLE\_COUNT * LCM(T_1, \ldots, T_{X-1}) * RES_p}{T_1}, & X > 2 \\ \Delta + (CYCLE\_COUNT * RES_p), & X = 2 \end{cases}$$

Block 518 determines if X is less than N. If so, block 520 increments X and processing returns to block 504. If X has reached N, the value of $\Delta$ is output as the multi-turn angular rotation of the primary gear in block 524.

Having described preferred embodiments of a system and method for absolute motor position sensing (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A position sensor, comprising:
a system of N gears meshed with one another, each gear having a unique number of teeth, a first gear being mounted to an input shaft;
a set of N angular position sensors, each configured to measure the angular position of a respective gear in the system of N gears within one rotation;
a control module configured to determine an angular position of the input shaft over multiple rotations using the measured angular positions of the N gears, wherein a maximum number (M) of rotations of said input shaft and the number of teeth on each gear $T_x$ are configured such that $M \leq LCM(T_1, T_2, \ldots, T_N)/T_1$, where the gear with $T_1$ teeth is the first gear.

2. The position sensor in claim 1, wherein the control module is configured to compute an error signal (ERRref) that represents deviation from an expected phase relationship between the measured angular positions.

3. The position sensor of claim 1, wherein each gear in the system of N gears is connected to a separate magnet and the set of N angular position sensors are non-contacting magnetic angle sensors that are configured to detect an angle of a respective magnet.

4. The position sensor of claim 3, wherein a gap exists between each gear and its respective magnetic sensor.

5. The position sensor of claim 1, wherein the gear with the least number of teeth is the gear that is mounted to the input shaft.

6. The position sensor of claim 1 wherein the number of teeth on each gear is relatively prime to the number of teeth on one or more of the other gears.

7. The position sensor of claim 1, wherein the set of N angular position sensors all have a same resolution.

8. The position sensor of claim 1, wherein all gears in the system of N gears that are not mounted to the input shaft are meshed directly with the first gear.

9. The position sensor of claim 1, wherein the control module is further configured to determine the multi-turn angular position over multiple rotations of the input shaft based on a reference angle for each gear and the measured angular position of each gear.

10. An electromechanical actuator, comprising:
an electric motor, comprising a rotor and a stator;
a mechanical output stage that is driven by said electric motor;
a system of N gears meshed with one another, each gear having a unique number of teeth, a first gear being mounted to an input shaft that rotates in accordance with the electric motor;
a set of N angular position sensors, each configured to measure the angular position of a respective gear in the system of N gears within one rotation;
a control module configured to determine an angular position of the input shaft over multiple rotations using the measured angular positions of the N gears, wherein a maximum number (M) of rotations of said input shaft and the number of teeth on each gear $T_x$ are configured such that $M \leq LCM(T_1, T_2, \ldots, T_N)/T_1$, where the gear with $T_1$ teeth is the first gear.

11. The electromechanical actuator of claim 10, wherein the control module is configured to compute an error signal (ERRref) that represents deviation from an expected phase relationship between the measured angular positions of the gears.

12. The electromechanical actuator of claim 10, wherein each gear in the system of N gears is connected to a separate magnet and the set of N angular position sensors are non-contacting magnetic angle sensors that are configured to detect an angle of a respective magnet.

13. The electromechanical actuator of claim 12, wherein a gap exists between each gear and its respective magnetic sensor.

14. The electromechanical actuator of claim 10, wherein the number of teeth of each gear is relatively prime to the number of teeth on one or more of the other gears.

15. The electromechanical actuator of claim 10, wherein the gear with the least number of teeth is the first gear.

16. The electromechanical actuator of claim 10, wherein the set of N angular position sensors all have a same resolution.

17. The electromechanical actuator of claim 10, wherein the control module is further configured to determine the multi-turn angular position over multiple rotations of the input shaft based on a reference angle for each gear and the measured angular position of each gear.

18. The electromechanical actuator of claim 10, wherein the rotor of said electric motor is mounted to the input shaft and directly drives the first gear.

19. The electromechanical actuator of claim 10, wherein the rotor of said electric motor is mounted to a gear other than the first gear, and drives said input shaft by transmitting torque through the meshing of the system of N gears.

20. The electromechanical actuator of claim 10, wherein the control module is further configured to compute a rotor angle by combining an angle sensor value that corresponds to the rotor of said electric motor with an offset value.

21. The electromechanical actuator of claim 20, wherein the control module is further configured to commutate said electric motor using the computed rotor angle.

22. The electromechanical actuator of claim 20, wherein the control module is further configured to perform Field Oriented Control of said electric motor using the computed rotor angle.

23. The electromechanical actuator of claim 10, wherein the control module is further configured to perform closed-loop control of said electric motor using the computed angular position of said input shaft over multiple rotations as feedback.

24. The electromechanical actuator of claim 10, wherein all gears in the system of N gears that are not mounted to the input shaft are meshed directly with the first gear.

25. A method of determining angular position over multiple rotations, comprising:
measuring an angular position within one rotation of each gear within a system of N gears that are meshed together, each gear having a unique number of teeth;
iteratively determining a number of full cycles for subsets of the system of N gears;
calculating a number of full rotations of a first gear using the iteratively determined number of full cycles for the subsets of gears; and
calculating an angular position of the first gear over multiple rotations using the calculated number of first gear full rotations and the measured angle value of the first gear within one rotation.

26. The method of claim 25, wherein the number of teeth of each gear in the system of N gears is relatively prime to the number of teeth on one or more of the other gears.

27. The method of claim 25, wherein iteratively determining a number of full cycles for subsets of the system of N gears begins with a subset that includes only the first gear and continues with one additional gear in the subset for each new iteration.

28. The method of claim 25, wherein calculating the angular position of the first gear over multiple rotations uses a reference angle for each gear and the measured angle of each gear.

29. The method of claim 28, wherein the reference angles for each gear represent the angle within one rotation of said gear at a known angular position over multiple rotations of the first gear.

30. The method of claim 25, wherein determining the number of full cycles of a subset of the system of N meshed gears comprises:
determining a position of a window of contiguous angle values within one rotation of a gear X that is not included in said subset of gears,
testing if the measured angle of gear X falls within said window,
changing the position of said window by an amount equal to the angular change in X caused by a change of one or more full cycles of said subset of gears, and
repeating said testing and changing until the measured angle of gear X falls within said window or until the position of said window returns to an original window position.

31. The method of claim 25, further comprising computing an error signal (ERRref) that represents deviation from an expected phase relationship between the measured angular positions within one rotation of the gears.

* * * * *